Figure 10:
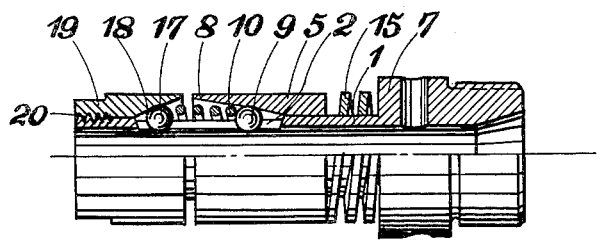

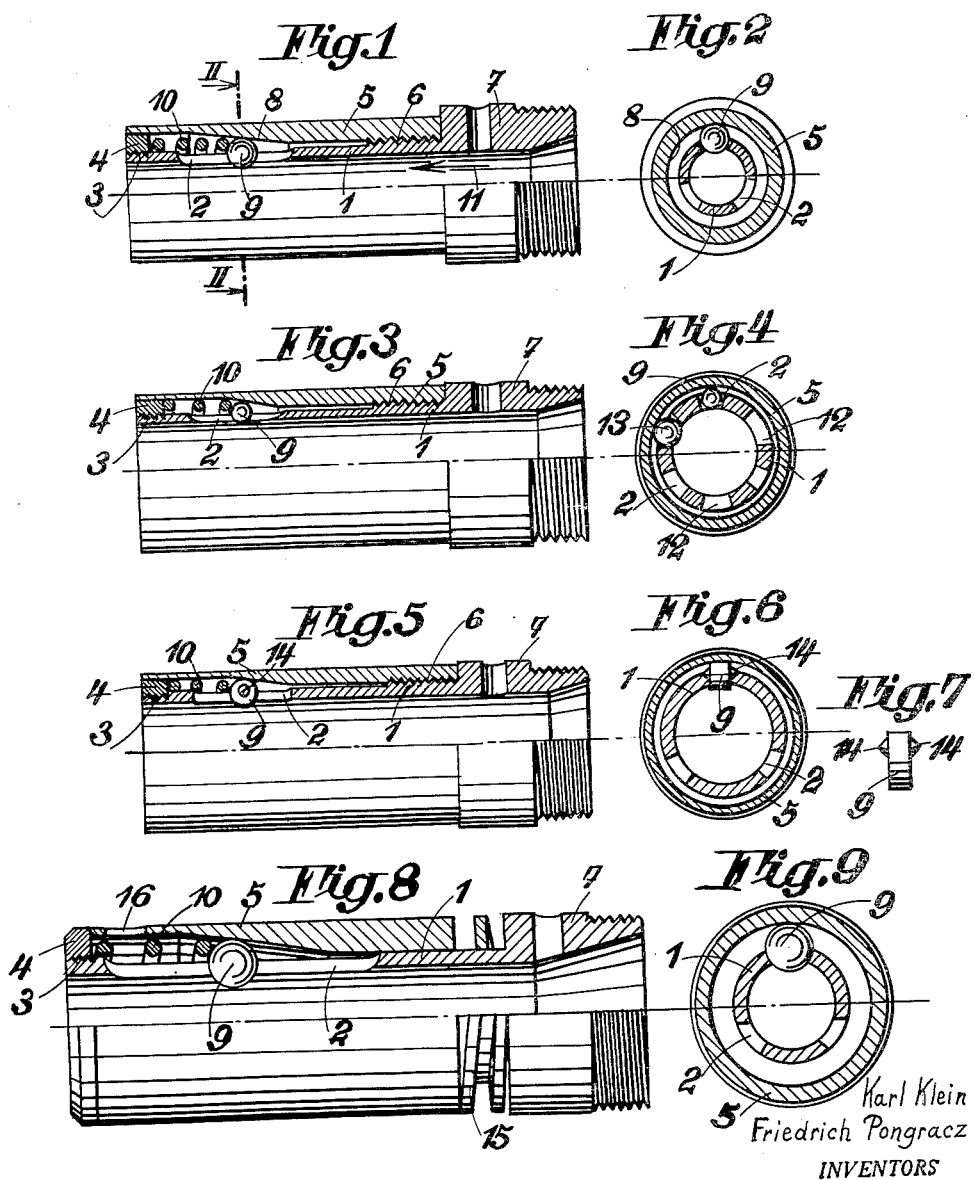

Jan. 30, 1962  K. KLEIN ET AL  3,019,027
FEED COLLET FOR SINGLE- AND MULTI-SPINDLE AUTOMATIC
MACHINE TOOLS, TURRET LATHES, PRECISION
LATHES AND THE LIKE MACHINE TOOLS
Filed May 11, 1960  2 Sheets-Sheet 2

Karl Klein
Friedrich Pongracz
INVENTORS

BY

Agent 3,019,027
FEED COLLET FOR SINGLE- AND MULTI-SPIN-
DLE AUTOMATIC MACHINE TOOLS, TURRET
LATHES, PRECISION LATHES AND THE LIKE
MACHINE TOOLS
Karl Klein, Vienna, Austria, and Friedrich Pongracz,
Hallergasse 31–33, Vienna XI, Austria; said Klein
assignor to said Pongracz
Filed May 11, 1960, Ser. No. 28,347
Claims priority, application Austria May 19, 1959
8 Claims. (Cl. 279—30)

This invention relates to a feed collet for workpieces to be machined on automatic machine tools. The known feed collets have several clamping elements which engage the periphery of the workpiece to be fed and which are slidably fitted in the collet bushing in guides extending at an acute angle to the longitudinal axis of the collect and which are under the pressure of a resilient spring pad which pushes them forward against the workpiece to be gripped so that they release the workpiece for movement in one axial direction whereas they hold the workpiece against movement in the opposite direction. With these known feed collets only such bar stock can be fed which either agrees to the passage width of the collet or is only slightly smaller in diameter. For this reason feed collets for various bar diameters are available in the trade because the feed collet must conform to the thickness of the respective bar stock. Besides, black material or forged bar stock, which is of irregular roundness or polygonal is only very poorly gripped by such feed collets owing to this critical relation. Even the introduction of the bar stock into such feed collets involves often considerable difficulty owing to this critical relation of the diameters.

In order to increase the gripping range of such feed collets and to avoid the above-mentioned disadvantages of the known feed collets, the feed collet according to the invention comprises an inner guide bushing having angularly spaced longitudinal slots, and an outer bushing having an internal cone and the rolling clamping elements are mounted in the longitudinal slots for movement in the axial direction of the bushing and engage the internal cone of the outer bushing under the axial pressure of the resilient spring pad.

The object set forth can be accomplished in various ways. In one embodiment of the feed cartridge according to the invention the guide sleeve has between the longitudinal slots associated with a given set of rolling clamping elements a like number of longitudinal slots having a larger clear width and having associated therewith a set of rolling clamping elements larger in diameter, each of the two sets of clamping elements being replaceable by the other but being insertable only into the set of longitudinal slots associated therewith. This measure enables an essential increase in the gripping range of a single feed collet.

In another embodiment of the feed cartridge according to the invention the clamping elements are provided with pins which are eccentric relative to the axis of the respective element and which may be conical and slide on slot flanks of the longitudinal slots, which flanks conform to the shape of the cone and taper in the slot profile. This measure alone enables also an increase in the gripping range of the feed collet.

Finally, for machines having a positive feed, it is recommendable to arrange the outer bushing axially slidably on the inner guide bushing and to subject it to the action of an axial compression spring which bears on the inner guide sleeve. Such feed collects can be made in any of the embodiments mentioned hereinbefore.

In the drawing a feed collet according to the invention is shown by way of example in several embodiments in longitudinal and transverse sectional views. FIGS. 1 and 2 show a feed collet having a passage range between 10 mm. and 15 mm. for machine having a maximum passage of 25 mm. FIGS. 3 and 4 show a feed cartridge having two groups of longitudinal slots of different clear widths, for two sets of clamping elements of different size. FIGS. 5 and 6 show an embodiment of the feed collet comprising clamping elements having eccentric pins. Such a clamping element is shown on an enlarged scale in FIG. 7. Finally, FIGS. 8 and 9 show a feed collet having a compensating spring for machines operating with a positive feed. FIG. 10 is a longitudinal sectional view showing another embodiment of the feed collet.

In the first embodiment shown in FIGS. 1 and 2 the inner guide bushing 1 has, e.g., three longitudinal slots 2 spaced by an angle of 120° and axially spaced from the front end face of the bushing 1. The freely opening end of the guide bushing 1 is provided with an external screw thread 3, on which a nutlike spring abutment 4 can be screwed. An outer bushing 5 can be screwed on the inner guide bushing 1 by means of a screw thread 6 as far as to a lollar 7. This outer bushing 5 has an internal cone 8 opposite to the longitudinal slots 2. The longitudinal slots 2 receive rolling clamping elements 9, which consist in this embodiment of balls urged by the internal cone 8 to a predetermined maximum depth of penetration against the bar stock introduced into the guide bushing 1. The balls 9 are under the pressure of a spring 10 which bears on the abutment 4 and always holds the balls ready for engagement. The feed collet shown is intended, e.g., for a passage range of 10–15 mm. and may be mounted on a machine having a maximum passage approximately 25 mm. in diameter. For this reason the maximum passage range of the machine can be covered with a few feed collets for various passage ranges. Bar stock, of round or polygonal shape in cross-section, is introduced into the feed cartridge according to FIG. 1 in the direction of the arrow 11. The balls 9 yield against the action of the spring 10 so that they hardly oppose the feed movement of the bar stock. The same unopposed slide movement of the balls occurs during the retracting movement of the feed collet. On the other hand, if the feed collet is moved in the feed direction indicated by the arrow 11 the balls 9 will engage the bar stock immediately under the pressure of the cone 8 of the bushing 6 to push this bushing forwardly. Any differences in the diameter of the bar stock are compensated by the balls themselves.

This feed collet acts at the same time as a backfeed preventing device in cases in which the bar stock while being machined is subjected to a high axial pressure which might cause the bar stock to slip through the closed feed collet. Such back-slipping of the bar stock is prevented by the feed collet because the balls 9 held by the inside cone 8 of the outer bushing 5 act on the bar stock with a force which is the stronger the higher is the axial pressure on the bar stock. The backfeed preventing device will also prevent a return feed of the bar stock when the feed collet is open, e.g., in long-turning automatic machines operating with a gravity feed.

It was previously possible that the elasticity of the bar stock caused the same to spring back when it was being fed against the stop for the material. This was liable to result in certain length differences. This disadvantage is eliminated by the new feed collet.

In the second embodiment of the feed collet, which is shown in FIGS. 3 and 4, the guide bushing 1 is formed with two groups of longitudinal slots. The group formed by the narrow longitudinal slots is designated 2. The group formed by the longitudinal slots larger in clear width is designated 12. The longitudinal slots are spaced, e.g., by 120° and the longitudinal slots 12 lie in the spaces between the longitudinal slots 2 and are staggered therefrom by 60°. The longitudinal slots 2 receive balls 9 and balls 13 larger in diameter are provided for the wider longitudinal slots 12. Only one of the two sets of balls is used at a time, of course, depending on the desired passage range. It is suitable to give the balls 13 larger in diameter a larger range of axial movement than the smaller balls. In accordance therewith the depth of penetration of the smaller balls is smaller than that of the larger balls. For this reason the same feed collet can be used with the small balls 9 for reliably gripping and exactly feeding bar stock of, e.g., 20–22 mm., and with the larger balls 13 for bar stock having a diameter as small as 18 mm. It is also essential that a workpiece of triangular or hexagonal cross-section can easily and reliably be gripped with this feed collet.

A feed collet which is particularly suitable for feeding profiled material is shown in FIGS. 5 and 6. In this feed collet the clamping elements 9 consist of rollers having pins 14 which are eccentric with respect to the axes of the rollers. These pins are suitably conical and engage the flanks of the longitudinal slots, the cross-sectional profile of which tapers toward the center of the cross-section of the bushing. This measure may also be adopted to provide a larger depth of penetration of the clamping elements resulting in a larger passage range of the feed collet.

FIGS. 8 and 9 show an embodiment of the feed collet in which, as contrasted with the previously described examples, the outer bushing is axially slidably mounted on the inner guide bushing 1 and is under the action of an axial compression spring 15, which has a compensating function in machines having a positive feed. The embodiment shows also at the end of the outer bushing 5 a radial bore 16 having a width which corresponds in diameter to the balls 9. Through this bore 14 the balls 9 may be inserted from the outside into the longitudinal slots and may be retained by a relative rotation of the two bushings 1 and 5.

In the embodiment shown in FIG. 10 the inner guide bushing 1 has, e.g., three longitudinal slots 2 spaced 120° apart and axially spaced from its front end face. The other end of the guide bushing 1 is formed with a collar 7 having a screw-threaded extension. This collar is engaged by the axial compression spring 15, which exerts resilient pressure in an axial direction on an outer bushing 5, which is axially slidably mounted on the guide bushing 1. This bushing 5 has an internal cone 8, which is disposed opposite to the longitudinal slots 2 of the guide bushing 1 and holds the rolling clamping elements 9 in the longitudinal slots 2 in order to retain the bar stock introduced into the guide bushing 1. The cross-section of the longitudinal slots 8 is so selected that the clamping elements cannot fall through into the bore of the guide bushing.

The same longitudinal slots 2 of the guide bushing 1 are engaged by a second set of clamping elements 17, which are held by an internal cone 18 of an additional outer bushing 19, which is screwed on the free end of the guide bushing 1, which free end has a screw thread 20. For this reason the outer bushing 19 has two flats for engagement by a wrench.

The internal cone 18 of this additional bushing 19 is much steeper than that of the axially movable outer bushing and serves only to exert together with the clamping elements 17 a slight clamping action or braking action on the bar stock during the feeding of the bar. The axial compression spring 10 arranged between the two clamping elements 9 and 17 always urges the clamping elements 9, 17 of both sets of clamping elements against their internal cones 8, 18.

In this embodiment too it is quite possible to provide the guide bushing 1 with two sets of longitudinal grooves 2 having different inside widths in such a manner that the longitudinal slots having a smaller inside width lie always between the longitudinal slots having a larger inside width. The rolling clamping elements are always provided in two different sizes and are alternatingly usable in the feed collet.

We claim:

1. A machine-tool feed collet, comprising a guide sleeve adapted to receive with clearance a workpiece axially fed therethrough, said sleeve being provided with at least one axial slot; a rollable gripping member disposed within said slot and extending into said clearance; a cam member connected to said guide sleeve and formed with a cam surface diverging in the direction of workpiece feed from said slot; and spring means for displacing said gripping member relatively to said sleeve and said cam member oppositely to said direction of feed into concurrent engagement with said workpiece and said surface.

2. A machine-tool feed collet, comprising an inner sleeve adapted to receive with peripheral clearance a workpiece axially fed therethrough, said inner sleeve being provided with a plurality of angularly equispaced axial slots; a rollable gripping member disposed within said slot and extending into said clearance; an outer sleeve connected to said inner sleeve and formed with an internal conical surface diverging in the direction of workpiece feed; and spring means for displacing said gripping members relatively to said sleeves oppositely to said direction of feed into concurrent engagement with said workpiece and said surface.

3. A machine-tool feed collet, comprising an inner sleeve adapted to receive with peripheral clearance a workpiece axially fed therethrough, said inner sleeve being provided with a plurality of angularly equispaced axial slots; a rollable gripping member disposed within said slot and extending into said clearance; an outer sleeve resiliently connected to said inner sleeve and formed with an internal conical cam surface diverging in the direction of workpiece feed; and spring means between said sleeves for displacing said gripping members relatively to said sleeves oppositely to said direction of feed into concurrent engagement with said workpiece and said surface.

4. A machine tool feed collet, comprising an inner sleeve adapted to receive with peripheral clearance a workpiece axially fed therethrough, said inner sleeve being provided with a plurality of angularly equispaced axial slots; a rollable gripping member disposed within said slot and extending into said clearance; an outer sleeve connected to said inner sleeve and formed with an internal conical cam surface diverging in the direction of workpiece feed; and spring means for displacing said gripping members relatively to said sleeves oppositely to said direction of feed into concurrent engagement with said workpiece and said surface, each of said gripping members being provided with a tapered eccentric pivot pin in engagement with the longitudinal edges of a respective one of said slots, said edges being formed with complementarily tapering surfaces.

5. A machine-tool feed collet, comprising a guide sleeve adapted to receive with clearance a workpiece axially fed therethrough, said sleeve being provided with at least one axial slot; a rollable gripping member disposed within said slot and extending into said clearance; a cam member connected to said guide sleeve and formed with an internal conical cam surface spaced from the outer surface of said inner sleeve and diverging in the direction of workpiece feed, said outer sleeve being provided with an opening affording access to the space between said surfaces whereby a gripping member may be inserted therein; and spring means in said space for displacing said gripping members relatively to said sleeves oppositely to said direction of feed into concurrent engagement with said cam surface and said workpiece.

6. A machine-tool feed collet, comprising an inner sleeve adapted to receive with peripheral clearance a workpiece axially fed therethrough, said inner sleeve being formed with two interspersed groups of angularly equispaced axial slots of different widths adapted to receive respective sets of rollable gripping members projecting into said clearance upon insertion into the associated slots; an outer sleeve connected to said inner sleeve and formed with an internal conical cam surface diverging in the direction of workpiece feed; and spring means for displacing the inserted gripping members of a selected set relatively to said sleeves into concurrent engagement with said workpiece and said surface.

7. A machine-tool feed collet, comprising an inner sleeve adapted to receive with peripheral clearance a workpiece axially fed therethrough, said inner sleeve being formed with a plurality of angularly equispaced axial slots; a pair of rollable gripping members disposed within each of said slots and extending into said clearance; outer sleeve means surrounding said inner sleeve and formed with a first internal conical cam surface spaced from the outer surface of said inner sleeve and diverging in the direction of workpiece feed at a relatively small angle and a second internal conical cam surface axially spaced from said first cam surface and converging in the direction of workpiece feed at a relatively steep angle; and spring means for displacing one of the rollable gripping members of each of said pairs relatively to said inner sleeve against each of said cam surfaces and into engagement with said workpiece.

8. A machine-tool feed collet, comprising an inner sleeve adapted to receive with peripheral clearance a workpiece axially fed therethrough, said inner sleeve being formed with two interspersed groups of angularly equispaced axial slots of different widths adapted to receive respective sets of rollable gripping-member pairs projecting into said clearance upon insertion into the associated slots; outer sleeve means surrounding said inner sleeve and formed with a first internal conical cam surface diverging in the direction of workpiece feed at a relatively small angle, and a second internal conical cam surface axially offset from said first cam surface and converging in the direction of workpiece feed at a relatively steep angle; and spring means for displacing the inserted gripping members of a selected set relatively to said sleeve into engagement with said workpiece and said cam surfaces.

References Cited in the file of this patent

UNITED STATES PATENTS

| 1,089,755 | Fischer | Mar. 10, 1914 |
| 2,062,628 | Yannetta | Dec. 1, 1936 |

FOREIGN PATENTS

| 651,556 | Great Britain | Apr. 4, 1951 |